US008089400B1

(12) United States Patent
Fang et al.

(10) Patent No.: US 8,089,400 B1
(45) Date of Patent: Jan. 3, 2012

(54) NETWORK ASSISTED GPS POSITIONING FOR FEMTO CELLS IN WIRELESS NETWORKS

(75) Inventors: Yonggang Fang, San Diego, CA (US); Rajesh Bhalla, Westmont, IL (US)

(73) Assignee: ZTE (USA) Inc., Iselin, NJ (US)

( * ) Notice: Subject to any disclaimer, the term of this patent is extended or adjusted under 35 U.S.C. 154(b) by 157 days.

(21) Appl. No.: 12/137,532

(22) Filed: Jun. 11, 2008

Related U.S. Application Data

(60) Provisional application No. 60/943,262, filed on Jun. 11, 2007.

(51) Int. Cl.
*G01S 19/05* (2010.01)
(52) U.S. Cl. .................................................. 342/357.42
(58) Field of Classification Search ............... 342/357.4, 342/357.42
See application file for complete search history.

(56) References Cited

U.S. PATENT DOCUMENTS

| 6,188,351 | B1 * | 2/2001 | Bloebaum ................ 342/357.15 |
| 6,473,030 | B1 * | 10/2002 | McBurney et al. ....... 342/357.03 |
| 6,999,725 | B2 * | 2/2006 | Nitta et al. .................... 455/63.1 |
| 7,158,782 | B2 * | 1/2007 | Masuda ......................... 455/418 |
| 7,576,692 | B2 * | 8/2009 | Sairo et al. ..................... 342/386 |
| 7,688,260 | B2 * | 3/2010 | Pomerantz et al. ....... 342/357.09 |
| 2002/0142783 | A1 * | 10/2002 | Yoldi et al. ..................... 455/456 |
| 2007/0087740 | A1 * | 4/2007 | Petersen et al. ............. 455/422.1 |
| 2007/0096981 | A1 * | 5/2007 | Abraham ................. 342/357.15 |
| 2008/0244148 | A1 * | 10/2008 | Nix et al. ........................ 710/313 |

OTHER PUBLICATIONS

Wireless News, "Samsung Leverages Trimble's GPS Timing Solution for its Ubicell System," Jul. 2007, 2 pages.*

* cited by examiner

*Primary Examiner* — Gregory C Issing
(74) *Attorney, Agent, or Firm* — Perkins Coie LLP

(57) ABSTRACT

Network designs and techniques for using a navigation satellite positioning system to operate a femto cell base station in a wireless network.

9 Claims, 3 Drawing Sheets

NETWORK ASSISTED GPS POSITIONING FOR FEMTO CELLS IN WIRELESS NETWORKS

PRIORITY CLAIMS AND RELATED PATENT APPLICATIONS

This application claims the benefit of U.S. Provisional Application No. 60/943,262 entitled "Network Assisted GPS Positioning for Femto Cells in Wireless Networks" and filed on Jun. 11, 2007. The entire disclosure of the above patent application is incorporated by reference as part of the specification of this application.

BACKGROUND

This application relates to wireless communications.

A Femto Cell is a tiny mobile cell designed to provide wireless extension to homes, or businesses which might not be covered by normal macro cells or micro cells. When a mobile station enters a Femto cell coverage area, the mobile station is connected to a Femto Access Point (FAP) which in part functions a Femto base station for the Femto Cell. The mobile station then continues to receive services through the FAP. A FAP provides radio transmission to mobile stations, with radio transmission links based on existing wireless technologies such as those being defined by 3GPP, 3GPP2 or IEEE802.16. Different from a regular base station in a typical wireless network, a Femto Access Point uses wired broad band connections, such as DSL or cable modem at homes or businesses as the backhaul link for connecting to the wireless Core network.

Femto Access Point can be configured in various configurations. In one example, a FAP may include a built-in BSC/RNC function and connect to the Core Network through a Femto Gateway (FGW) via VPN. In another configuration a FAP may be configured to provide some basic Base Station (BS) functions only, and connects to a legacy BSC/RNC through VPN tunnel with FGW over wired broad band connection. Various radio access networks, including CDMA2000, UMB, LTE, WCDMA, WiMAX and others, are synchronized networks. A Global Positioning System (GPS) receiver can be used for providing timing reference for the radio access network so that the entire network can be synchronized to a single timing source.

SUMMARY

The techniques and network designs described in this application relate to Network Assisted GPS Positioning for Femto Cells. The techniques can be used to improve the acquisition sensitivity and acquisition time of Femto Cell GPS receivers in various systems such as 3GPP2 femto cell or 3GPP home base station or WiMAX Femto cells.

In one implementation, a method for using a navigation satellite positioning system to operate a femto cell base station in a wireless network includes:

providing a navigation satellite positioning receiver in a femto cell base station to receive positioning signals from a navigation satellite positioning system;

providing a navigation satellite positioning client module in the receiver to communicate navigation satellite positioning messages with the network and to control the receiver in receiving the positioning signals;

providing a navigation satellite positioning server module in the network to communicate with the navigation satellite positioning client module and to maintain a database of location information of femto cell base stations in the network and corresponding geographic latitude, longitude and elevation data associated with a location of each femto cell base stations;

operating the navigation satellite positioning client module to send the location information of the femto cell base station to the navigation satellite positioning server module;

in response to the location information of the femto cell base station, operating the navigation satellite positioning server module to search in the database to get geographic latitude, longitude and elevation data associated with the location information, compute the satellites covering the location based on the geographic latitude, longitude and elevation data and send the geographic latitude, longitude and elevation data and ID information of the satellites covering the location of the femto cell base station to the navigation satellite positioning client module;

operating the navigation satellite positioning client module to reset the receiver based on the geographic latitude, longitude and elevation data and ID information of the satellites from the navigation satellite positioning server module;

operating the receiver to acquire positioning signals from the satellites that are listed in ID information of the satellites from the navigation satellite positioning server module; and operating the receiver to update the geographic data and timing data of the femto cell base station based on the acquired positioning signals.

This and other implementations and features are described in greater detail in the attached drawings, the description and the claims.

DETAILED DESCRIPTION

Figure 1:
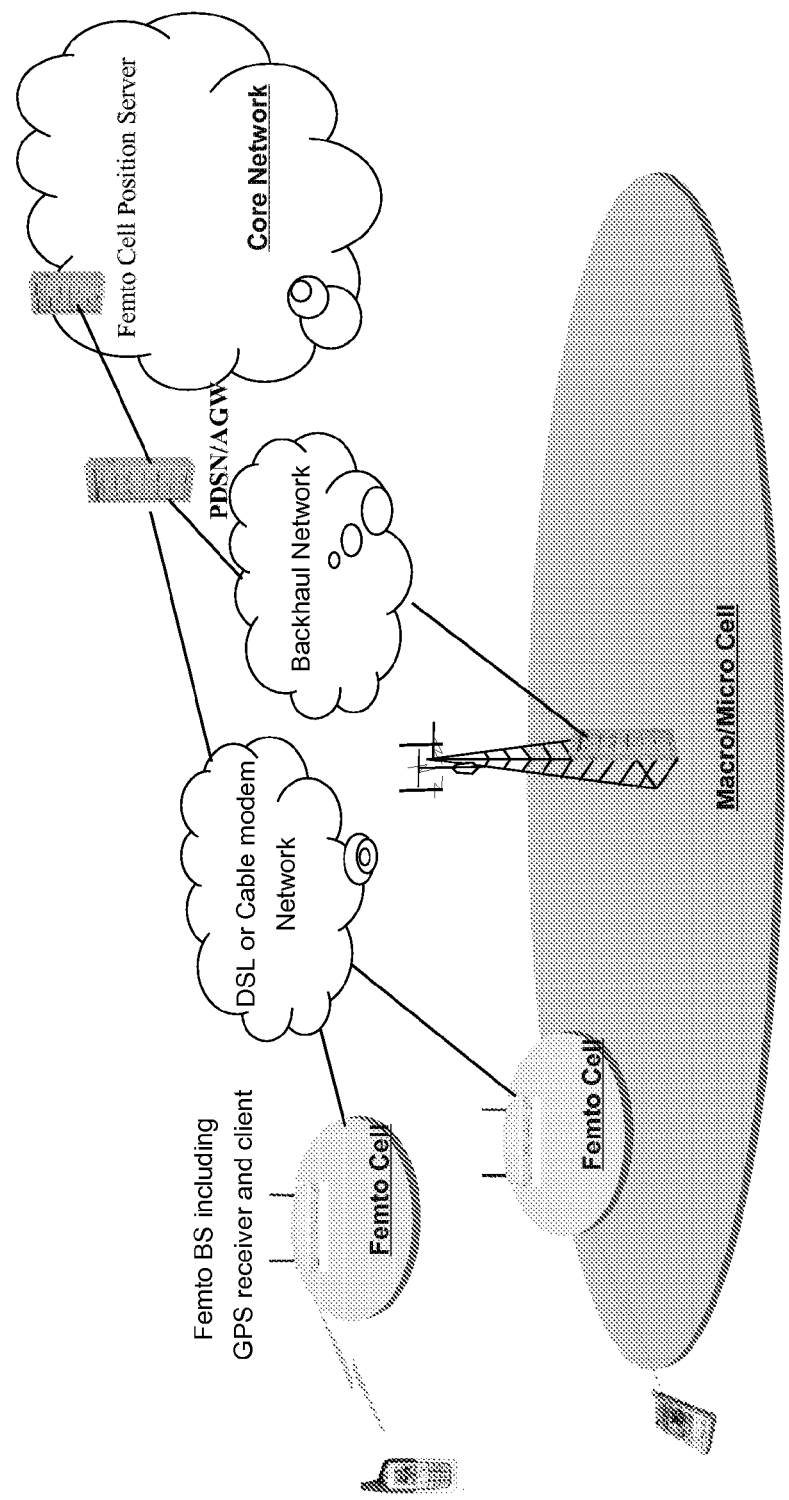
FIG. 1 shows an example of a communication network with femto cells in which the present network assisted GPS positioning mechanism can be implemented.

Global Positioning System uses satellites to provide position information to electronic devices. GPS operational constellation includes at least 24 satellites that orbit around the earth every 12 hours, and in one of six different orbital planes. The GPS provides ground receivers with line-of-sight visibility of six to eleven satellites from any point on the earth. Each GPS satellite broadcasts its coded orbit and time information to the ground GPS receiver devices. A GPS receiver is used to receive the GPS signal transmitted from GPS satellites. At least four GPS satellites signals are needed to obtain the positioning data and timing information: three GPS satellites' signals are used to determine latitude, longitude and elevation of the receiver and one GPS satellite's signal is used to provide precise timing information to determine each GPS signal to travel to the receiver. The latest generation of GPS receiver technology can track up to 20 GPS signals simultaneously.

Wireless base station equipment, such as macro, micro or pico cells are typically installed in outside environment, or at least their GPS antenna are installed outside in the open. Therefore, their GPS receivers have good receiving conditions, such as line-of-sight to the GPS satellites. For Femto cells, however, the Femto Access Points are normally installed in in-door environment, like homes or business offices. Due to the conditions of the in-door environment, the line-of-sight to GPS signals might not be seen by the GPS receivers in the FAPs. The receiving condition may be much worse than that for outdoors environments. For example, in many in-home environments, the GPS signal strength could be from −143 dBm to −158 dBm near windows, and drop significantly when moved further inside the buildings. In typical concrete apartment buildings, the GPS signal strength could be reduced even further. In addition, the high multi-paths of signals in the indoor environment could also adversely impact the GPS measurements.

Both the timing synchronization and accurate location information of the Femto Access Points can be used to provide Femto cell services. Since a Femto Access Point would typically be a user self installed device, location information of the FAP is needed by the network before authorizing services. Such location information of the FAP would also be needed by the carrier network for configuring and managing the Femto Access Points with parameters such as operating frequency channels, neighboring cells information, etc. Accurate location information is needed for emergency services as well, such as E911.

The network designs and techniques described in this application can be used to improve acquisition sensitivity and acquisition time of FAP GPS receivers and to address the GPS receiver issues for indoor settings and other conditions where GPS signals may be weak while allowing the FAP GPS receiver to acquire and synchronize with the GPS signals. For example, techniques described in this application can be used to accurately determine location of a Femto Cell BS using a Global Position System (GPS) receiver in the Femto Cell BS. In one implementation, the Femto Cell BS obtains ID information on the GPS satellites serving the geographic area of the Femto Cell BS from the network based on the address or zip code of the area in which the Femto Cell is located. The ID information on the GPS satellites can be used by the GPS client, e.g., GPS processing software, in the Femto Cell BS to control the GPS receiver in the Femto Cell BS to acquire GPS signals from the identified GPS satellites. The received GPS signals are processed to extract position and timing signals for the Femto Cell. The GPS system is an example of a navigation satellite positioning system and other navigation satellite positioning systems, e.g., the Galileo system in Europe may also be used.

A GPS receiver has two types of sensitivities: acquisition sensitivity and tracking sensitivity. Normally the tracking sensitivity is much lower than the acquisition sensitivity. With network assisted information, the acquisition sensitivity would be significantly improved compared to the un-assisted acquisition. In addition, the acquisition time of GPS receiver is also reduced significantly with the network assisted GPS information.

Figure 2:
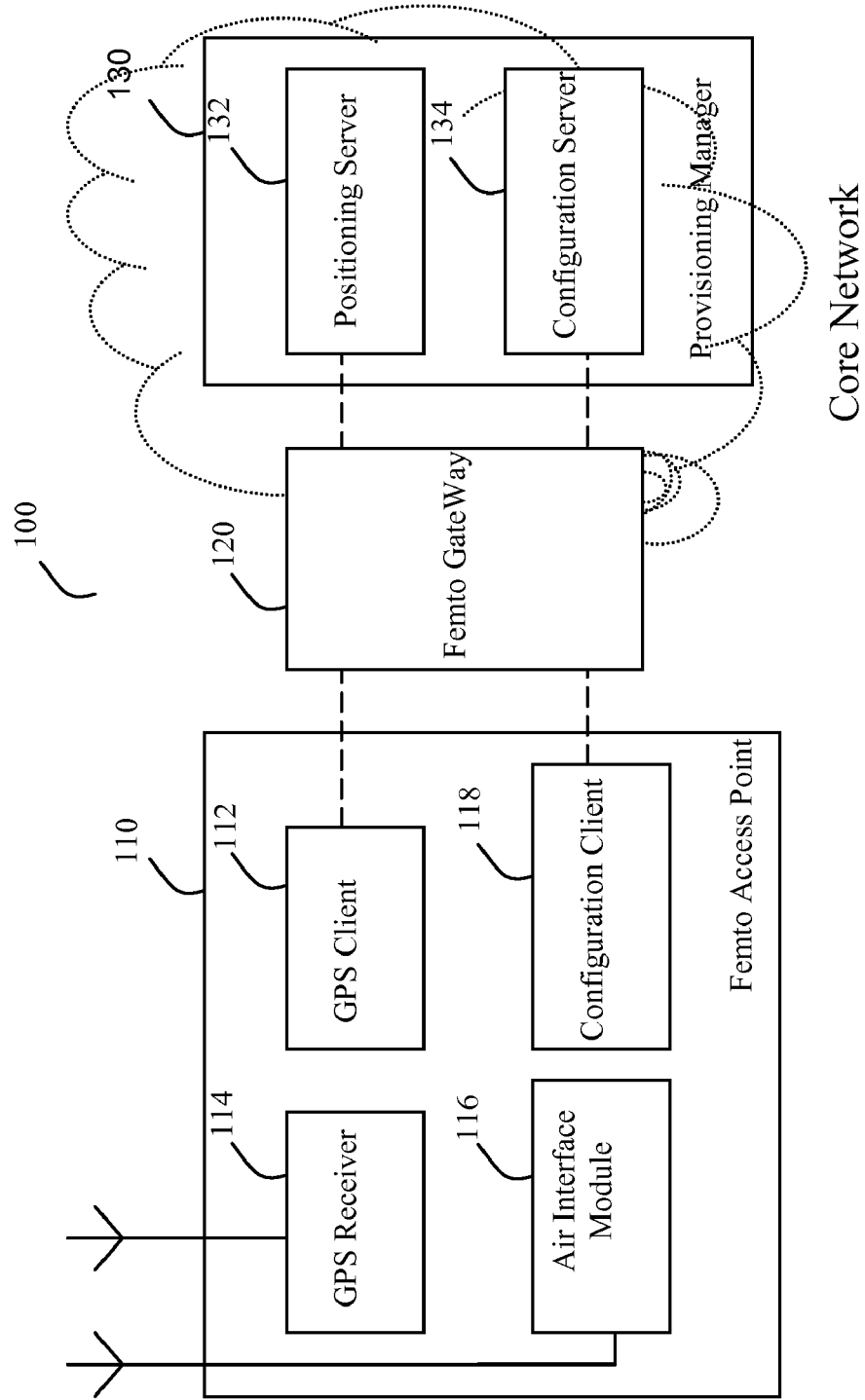
FIG. 2 shows examples of a femto access point, a femto gate way and a positioning manger in the core network.

FIG. 1 shows an example of a communication network system with micro and micro cells, femto cells connected to various network structures. FIG. 2 shows examples of a femto access point, a femto gateway and a positioning manger in the core network in a Femto system 100. This system 100 can be part of the system in FIG. 1.

In FIG. 2, the Femto Access Point (FAP) 110 is installed in an indoor environment at subscriber premises, such as home or business. FAP 110 communicates with wireless carrier network equipment installed in the core network via the Femto Gateway (FGW) 120. The communication path between the FAP 110 and FGW 120 is usually provided over wired broadband connections such as DSL or cable link. 130 is the Provisioning Manager in the carrier core network. Provisioning Manager 130 could be a stand alone entity in the carrier network or integrated in the carrier network provisioning and management system.

The FAP 110 in this example includes GPS Client 112, GPS Receiver 114, Air Interface Module 116 and Configuration Client 118 functions. GPS Receiver 114 communicates with the Global Positioning System satellites for obtaining location and timing information. The GPS Receiver 114 may be built using conventional GPS ASICs. The GPS Receiver 114 may additionally use ultra sensitive GPS receiver modules to provide additional sensitivity gain so as to receive GPS signals in very low GPS signal strength conditions. In one embodiment of the current invention, the GPS receiver interfaces with the GPS Client 112 for obtaining initial positioning and satellite tracking information for fast GPS signal acquisition. GPS Client 112 maintains client-server communications with the Positioning Server 132 entity in the Provisioning Manager 130.

GPS Client 112 provides FAP's 110 location information to the Positioning Server 132 through FGW 120. Such FAP location information may be, e.g., the street address of the FAP as input by the FAP subscriber, or pre-configured location information such as ZIP codes, names of the towns/cities for FAP being operated. This information may be stored in the memory of FAP for the next power cycle. Such information might also be the IP address of the port of DSL or cable modem networks.

Based on the location information received, the Positioning Server 132 searches its database for the latitude, longitude and elevation information of FAP 110 and calculates the information of GPS satellites visible from the location of FAP 110 at that moment, such as GPS satellite IDs. The Positioning Server 132 will send GPS satellites information back to the GPS Client 112. When GPS Client 112 receives initial GPS satellite information from the Positioning Server 132, the GPS client 112 instructs the GPS Receiver 114 to search for particular GPS satellites. Once the GPS signal is locked, the GPS Receiver 114 provides timing reference for FAP Air Interface Module 116 and location information to the Configuration Client 118 in the FAP 110.

In the example in FIG. 2, the Air Interface Module 116 provides typical wireless air interface such as CDMA2000, WCDMA, or WiMAX to mobile stations. The Configuration Client 118 is the repository of configuration parameters including the operating frequency channels, neighboring cell information etc. received from the Configuration Server 134 in the Provisioning Manager 130.

The Provisioning Manager 130 may include Positioning Server 132 and Configuration Server 134 functionalities. Provisioning Server 132 maintains a digital map database that maps home and business street address information provided by the FAP 110, or IP address of FAP 110 through DSL or cable modem port into geographic location such as latitude, longitude and elevation. Based on such geographic location information, the Positioning Server 132 determines the GPS satellites that are to be visible from the location of the associated FAP 110 at the particular moment. The Provisioning System 132 uses the backhaul broadband link to communicate with GPS Client 112 function in the FAP 110.

In one implementation, the following Femto Cell Configuration Procedure can be implemented:

1. Manual or automatic configure Femto BS:
   Configure the connection of VPN to PDSN/AGW;
   Configure the IP address of Femto Cell Position Server; and
   Set Home/Business address of the Femto BS located 2. Initiate connection of Femto BS to the network:

Femto BS establishes the VPN connection to PDSN/AGW over the wired broadband connection of DLS or cable modem networks; and Femto BS GPS client communicates to Femto Position Server and sends the Home/Business address to the Femto Cell Position Server and wait for the response from the Position Server 3. Femto Cell Position Server searches in the digital map database(s) to obtain the geographic position information on latitude, longitude and elevation based home/business address received, calculate the satellites visible in the location and their IDs, and send the geographic position information and Satellite IDs to GPS client of the Femto BS.

4. GPS client of Femto Cell resets the GPS receiver according the received GPS information.

5. GPS receiver starts to acquire the GPS signals. Once it locks the GPS signals, it updates the Femto BS location and timing information and provides timing reference for the Femto BS.

Figure 3:
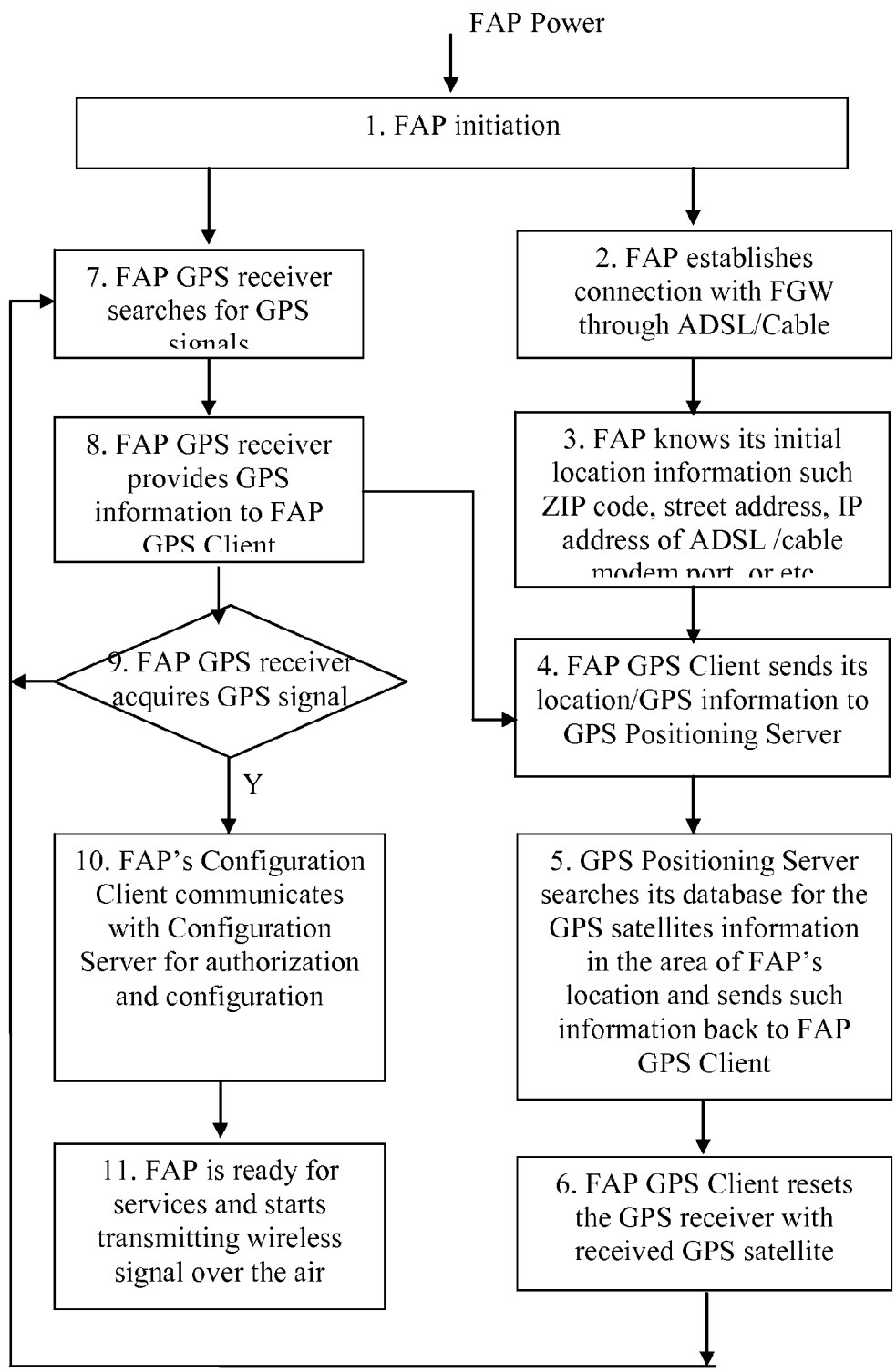
FIG. 3 shows an example of an operation flow for the femto access point in FIG. 2.

FIG. 3 shows an example of a provisioning procedure with the network assisted GPS positioning mechanism for the femto access point in FIG. 2.

1. FAP Initialization. After power on, the FAP 110 enters the initialization stage. FAP 110 may require the subscriber of Femto cell to do initial configuration of FAP through the GUI interface. This configuration may include, e.g., setting Femto Gateway IP address, Provisioning Manager IP address, street address of FAP, etc. After initial setting is completed, FAP 110 starts to establish the backhaul connection through DSL or cable modem network; obtains an IP address from local DHCP server or over the ISP network; and initializes GPS Receiver 114. FAP 110 may set Air Interface Module 116 on standby mode.

2. Setup connection to the operator's Core networks. FAP 110 initiates VPN tunneling to the FGW 120 in the Core network through the backhaul connection. The Core network may request FAP 110 to perform the device authentication including authenticating ESN of FAP, hardware ID or other manufacture related information.

3. FAP GPS Client 112 obtained the location information of FAP, such as street address, IP address of FAP on ADSL port, or pre-configured information like ZIP codes, names of cities/towns, etc. FAP GPS Client 120 may also possibly obtain the location information from the user's subscription in the Provisioning Manager 130.

4. FAP GSP Client 112 and Positioning Server 132 establish communication. FAP GPS Client 112 sends its location information to the Positioning Server 132 in the operator's Core network.

5. Based on the information received, the Positioning Server 132 searches its database for the information (such as GPS satellite IDs) of GPS satellites to be visible to FAP's location, and sends back to FAP GPS Client 110.

6. FAP GPS Client 112 resets GPS Receiver 114 to search for GPS signals from particular GSP satellites provided by the Positioning Server 132.

7. FAP GPS Receiver 114 continues searching for GPS signals based on the satellite information received, and report the status to GPS Client 112.

8. FAP GPS Client 112 gets the latest real time GPS Satellite information from the GPS Receiver 114 and sends to Positioning Server 142 to further fine tune tracking of FAP position.

9. If FAP GPS Receiver 114 acquires GPS satellite signals, it sends indication to FAP Configuration Client 118, and continues searching for the GPS signals.

10. FAP Configuration Client 118 establishes a connection to the Configuration Server 134 in the Provisioning Server 130. Configuration Client 118 sends basic setting information of FAP including its location to the Configuration Server 134 to perform FAP authorization. Provisioning Manager 130 checks the operation permission on the FAP location. If the FAP 110 is authorized to be operated in that location, the Configuration Server 134 sends the air interface configuration parameters for the FAP to the Configuration Client 118. FAP GPS Client 112 may send GPS satellites' information periodically during FAP operation for periodically authorization checking by Provisioning Manager 130. It may also send updated GPS information per request from Provisioning Manager 130.

11. FAP Configuration Client 118 passes the air interface configuration parameters to the Air Interface Module 116 to provision wireless air interface. Once it is done, FAP 110 is transmitting signal over the air and is ready for service.

The above mechanism and implementation of the Network Assisted GPS Positioning for Femto Cell can be used to improve the acquisition sensitivity of GPS receiver and reduce initial acquisition time due to the precise satellites information provided by Position Server according to FAP initial location received. This mechanism can be used to provide precise timing reference to FAP in the in-door environment to support handoff to macro or micro BSs and reduce interference to macro cells. It can also be used to provide accurate and real-time location information of FAP to the Provisioning Manager for FAP authorization. In addition, it can be used to support E911 positioning even for the mobile stations without GPS function.

While this application contains many specifics, these should not be construed as limitations on the scope of an invention that is claimed or of what may be claimed, but rather as descriptions of features specific to particular embodiments. Certain features that are described in this application in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications and enhancements to the described examples and implementations and other implementations may be made based on what is disclosed.

What is claimed is:

1. A method for using a navigation satellite positioning system to operate a femto cell base station in a wireless network, comprising:

providing a navigation satellite positioning receiver in a femto cell base station to receive positioning signals from a navigation satellite positioning system;

providing a navigation satellite positioning client module in the receiver to communicate navigation satellite positioning messages with the network and to control the receiver in receiving the positioning signals;

providing a navigation satellite positioning server module in the network to communicate with the navigation satellite positioning client module and to maintain a database of location information of femto cell base stations in the network and corresponding geographic latitude, longitude and elevation data associated with a location of each femto cell base stations;

operating the navigation satellite positioning client module to send location address information of the femto cell base station to the navigation satellite positioning server module, wherein the location address information comprises at least a portion of an address associated with an area in which the femto cell base station is located;

in response to the location address information of the femto cell base station, operating the navigation satellite positioning server module to search in the database to get geographic latitude, longitude and elevation data associated with the location address information, compute the satellites covering the location based on the geographic latitude, longitude and elevation data and send the geographic latitude, longitude and elevation data and ID information of the satellites covering the location of the femto cell base station to the navigation satellite positioning client module;

operating the navigation satellite positioning client module to reset the receiver based on the geographic latitude, longitude and elevation data and ID information of the satellites from the navigation satellite positioning server module;

operating the receiver to acquire positioning signals from the satellites that are listed in ID information of the satellites from the navigation satellite positioning server module; and operating the receiver to update the geographic data and timing data of the femto cell base station based on the acquired positioning signals.

2. The method of claim 1, wherein the location address information comprises a ZIP code.

3. The method of claim 1, wherein the location address information comprises a name of a city.

4. A method, comprising:

sending, from a femto cell base station to a positioning server, address information associated with an area in which the femto cell base station is located;

identifying, at the positioning server, identities of one or more satellites in a navigation satellite positioning system that cover the area, wherein the femto cell base station is configured to provide wireless service to mobile stations;

receiving, at the femto cell base station from the positioning server, satellite identity information that comprises the identities of the one or more satellites of the navigation satellite positioning system that cover the area;

operating a receiver in the femto cell base station to acquire positioning signals from the one or more satellites identified by the satellite identity information;

accessing geographic data and timing data of the femto cell base station; and updating the accessed geographic data and timing data of the femto cell base station based on the acquired positioning signals.

5. The method of claim 4, wherein sending information comprises sending a ZIP code associated with the address.

6. The method of claim 4, wherein sending information associated with the address comprises sending an Internet Protocol (IP) address that is associated with the address.

7. A system, comprising:

a server configured to provide information regarding visibility of satellites associated with a navigation satellite positioning system based on address information; and a femto cell base station configured to communicate with the server and provide wireless service to mobile stations, wherein the femto cell base station comprises a receiver to receive positioning information from the navigation satellite positioning system, wherein the femto cell base station is configured to perform operations comprising:

sending information associated with an address, which is associated with an area in which the femto cell base station is located, to obtain one or more identities of satellites in the navigation satellite positioning system that currently cover the area;

receiving satellite identity information that comprises identities of satellites of the navigation satellite positioning system that currently cover the area;

operating the receiver to acquire positioning signals from the satellites identified by the satellite identity information; and updating geographic data and timing data of the femto cell base station based on the acquired positioning signals.

8. The system of claim 7, wherein the femto cell base station is configured to send the information that comprises a ZIP code associated with the address.

9. The system of claim 7, wherein the femto cell base station is configured to send the information associated with the address that comprises an Internet Protocol (IP) address that is associated with the address.

* * * * *

UNITED STATES PATENT AND TRADEMARK OFFICE
CERTIFICATE OF CORRECTION

PATENT NO.         : 8,089,400 B1
APPLICATION NO.    : 12/137532
DATED              : January 3, 2012
INVENTOR(S)        : Yonggang Fang and Rajesh Bhalla It is certified that error appears in the above-identified patent and that said Letters Patent is hereby corrected as shown below:

In Column 4, Line 67, please delete "located" and insert -- located. --, therefor.

In Column 5, Line 8, please delete "Server" and insert -- Server. --, therefor.

In Column 5, Line 46, please delete "120" and insert -- 112 --, therefor.

In Column 5, Line 49, please delete "GSP" and insert -- GPS --, therefor.

In Column 5, Line 57, please delete "110." and insert -- 112. --, therefor.

In Column 5, Line 59, please delete "GSP" and insert -- GPS --, therefor.

Signed and Sealed this
Eighteenth Day of December, 2012

David J. Kappos
*Director of the United States Patent and Trademark Office*